United States Patent Office 3,192,237
Patented June 29, 1965

3,192,237
HYDROGENATION OF 5-UNSATURATED STEROIDAL 16-YLIDENALKYLCARBOXYLIC ACIDS
Morris Freifelder and Paul Kurath, Waukegan, Ill., assignors to Abbott Laboratories, North Chicago, Ill., a corporation of Illinois
No Drawing. Filed May 13, 1963, Ser. No. 280,120
3 Claims. (Cl. 260—397.1)

The present application is directed to a partial hydrogenation. More particularly, it deals with the selective hydrogenation of the side-chain double bond in certain 5-unsaturated steroidal 16-ylidenalkylcarboxylic acids.

In the preparation of steroid lactones such as are described in U.S. 3,045,012, and for other 5-unsaturated steroids with saturated side-chains at 16, selective hydrogenation of the side-chain double bond is necessary. In order to obtain certain therapeutically valuable steroids, retention of the unsaturation of C-5(-6) is desirable. Platinum catalysts are best suited for the reduction of the side-chain double bond. The usual reaction conditions lead to a concurrent reduction of the 5-double bond (see Fieser and Fieser, Steroids, Reinhold Publishing Corporation, New York, 1959, pp. 27, 28.). We have now found conditions which permit the use of platinum catalysts for the reduction of the side-chain without affecting the 5-double bond in the steroidal ring system and without necessitating the cumbersome procedure of protecting that double bond at 5.

It is an object of the present invention to hydrogenate the double bond at C-16 of steroid-16-ylidenalkylcarboxylic acids and their esters. It is another object of hydrogenate such side-chain double bonds of steriods which possess ring-unsaturation at C-5. It is a further object of the present invention to hydrogenate certain $\Delta^5$-steroid-16-ylidenalkylcarboxylic acids or their esters to the corresponding steroid acids or esters saturated at C-16 but without affecting the ring unsaturation between C-5 and C-6.

These and other objects are accomplished by suspending 1–5 parts of a compound of the formula

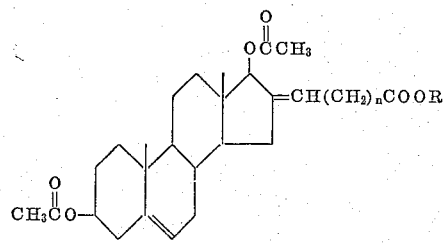

wherein R is hydrogen or lower alkyl and wherein $n$ is an integer from 0 to 2, in 100 parts by volume of alcohol in the presence of 1–5% of catalytic platinum based on the amount of steroid and about 5 parts of water, and subjecting said mixture to gaseous hydrogen until hydrogen uptake ceases. The alcohol used as the main reaction medium is a low-boiling alkanol, preferably methanol or ethanol.

The starting materials mentioned above are those described in U.S. 3,045,012.

The present invention is better understood by reference to the following examples which are given as illustrations only and are not meant to limit the invention.

EXAMPLE 1

*3β,17β-diacetoxy-5-androsten-16β-ylacetic acid*

(a) To a suspension of 0.086 gram of platinum oxide in 100 cc. of methanol and 5 cc. of water, is added 4.3 grams (0.01 mole) of 3β,17β-diacetoxy-5-androsten-16-ylidenacetic acid. The suspension is hydrogenated in a 500-cc. Parr shaker flask with a maximum hydrogen pressure of 40 p.s.i.g. at room temperature. Uptake of the theoretical amount of hydrogen is complete in less than one hour and continued reaction under these conditions will not produce further hydrogen uptake. The suspension is filtered and washed with glacial acetic acid in which the reduction product is soluble. The filtrate obtained in this manner is concentrated and recrystallized, producing 3β,17β-diacetoxy-5-androsten-16β-ylacetic acid in a yield of 82% of theory, melting at 255–259° C. Infrared examination of the product confirms its structure to be correct.

(b) When in the above example glacial acetic acid is used as the reaction medium, there is a tendency toward reduction of the double bond in the 5-position. A hydrogenation reaction carried out in this manner but interrupted after one hour at room temperature produces a yield of only 33% of the expected theoretical amount of 3β,17β-diacetoxy-5-androsten-16β-ylacetic acid while the remainder of the starting material is converted to 5-saturated and other compounds.

(c) In another repetition of the above example, 0.03 mole of starting material is hydrogenated in 150 cc. of methanol and 10 cc. of glacial acetic acid in the presence of 0.26 gram of platinum oxide. A fair yield of 3β,17β-diacetoxy-5-androsten-16β-ylacetic acid is obtained if hydrogenation is interrupted when the theoretically required amount of hydrogen necessary to saturate the side-chain double bond is absorbed. Without stopping hydrogenation at exactly the proper moment, the yield of desired material decreases.

(d) In another experiment carried out with the same starting materials but using pure methanol as the solvent, hydrogen uptake proceeds beyond the required uptake for the saturation of the side-chain double bond alone. When hydrogenation is interrupted as soon as the theoretical amount of hydrogen is absorbed, 3β,17β-diacetoxy-5-androsten-16β-ylacetic acid is obtained in a yield of 58%. This yield decreases if hydrogenation is allowed to continue without interruption.

EXAMPLE 2

*3-(3β,17β-diacetoxy-5-androsten-16β-yl)propionic acid*

To a suspension of 0.258 gram of platinum oxide in 250 cc. of methanol and 15 cc. of water is added 15.3 grams of 3-(3β,17β-diacetoxy-5-androsten-16-ylidene)-propionic acid and hydrogenation is carried out exactly as in Example 1(a). After less than one hour, hydrogen uptake ceases and 3-(3β,17β-diacetoxy-5-androsten-16β-yl)propionic acid is obtained in excellent yield, following the work-up procedure described in Example 1(a).

EXAMPLE 3

*4-(3β,17β-diacetoxy-5-androsten-16β-yl)butyric acid and its methyl ester*

In analogy to the process of Example 1(a), two parallel runs are carried out: in one flask, 4-(3β,17β-diacetoxy-5-androsten-16-ylidene)butyric acid, and in the other flask the methyl ester of said compound, are hydrogenated and worked up as described above. The isolated end products from both runs are the expected 16-saturated, 5-unsaturated compounds obtained in good yields.

The main advantage of the process of the present invention is the rapid and selective hydrogenation which does not affect the ring double bond. The present method provides a simple and fast means of hydrogenating only the desired side-chain double bond without the necessity of watching closely (and calculating) the amount of hydrogen absorbed, while it would be expected that the catalyst used herein would also promote saturation of the double bond at C-5.

The requirements for successful operation of the process of the present invention are the use of a low-boiling alkanol as the solvent, the presence of about 5% by volume of water in the reaction medium, and the use of a concentration of no more than about 5% of starting material in the liquid reaction medium. If the amount of water in the system is decreased substantially below the 5% limit given above, hydrogenation tends to proceed beyond the saturation of the side-chain double bond. However, with the above amount of water in the system, the reaction becomes self-controlled, i.e., hydrogenation stops when the desired reaction is completed.

It has been found through extensive experimentation that operation at concentrations of about 5% of starting material in the liquid reaction medium is preferred. If concentrations substantially above this limit are used, hydrogenation proceeds considerably slower, since the starting materials and reduction products are only sparingly soluble in alcohol and alcohol/water.

The platinum oxide used in the above examples may be substituted with other platinum catalysts and such catalysts can be in the form of chunks, pellets, powder or any other suitable form, including the carrier-supported form. Amounts of about 2% platinum based on the amount of steroid material have been found to be satisfactory, although amounts of from 1% to 5% will also produce good results. The reaction of the present invention can be carried out at room temperature, as demonstrated in the examples, but a temperature range of from 0° to 30° C. will produce equally good results. Since no extensive pressures are necessary for satisfactory results in this reaction, the so-called low-pressure equipment such as Parr shakers or stills can be used. Hydrogen pressures of from just beyond atmospheric pressure to 100 p.s.i.g. produce excellent results, but of course higher pressures may be used if desired.

Although the above only demonstrates the process of the present invention with the free acid and the methyl esters, it will be readily apparent that other esters are equally well suited as the starting materials, e.g., the ethyl, propyl or butyl esters.

Others may practice the invention in any of the numerous ways which will be suggested by the present disclosure to one skilled in the art. All such practice of the invention is considered to be a part hereof provided it falls within the scope of the appended claims.

We claim:
1. The process of hydrogenating a steroid of the formula

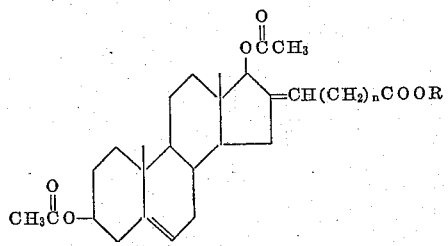

wherein R is selected from the group consisting of hydrogen and lower alkyl and wherein $n$ is selected from the integers 0, 1 and 2, comprising
   suspending 1–5 parts by weight of said steroid in 100 parts by volume of an alkanol having 1–3 carbon atoms and 5 parts by volume of water, and
   hydrogenating said mixture in the presence of 1–5% of a platinum catalyst based on the amount of steroid, at superatmospheric hydrogen pressure until hydrogen uptake ceases.

2. The process of claim 1 wherein said hydrogen pressure is below 100 p.s.i.g.

3. The process of claim 1 wherein said hydrogenation is carried out at a temperature of from 0° to 30° C.

References Cited by the Examiner

UNITED STATES PATENTS

| | | | |
|---|---|---|---|
| 3,039,528 | 6/62 | Arth et al. | 260—397.4 |
| 3,089,874 | 5/63 | Kurath et al. | 260—397.1 |
| 3,117,966 | 1/64 | Petrow | 260—239.55 |

OTHER REFERENCES

Fajkos: Collection Czech. Chem. Comm. (1959); vol. 24, page 2284 relied on.

LEWIS GOTTS, *Primary Examiner.*